United States Patent [19]
Buglewicz

[11] 3,953,679
[45] Apr. 27, 1976

[54] TELEPHONE ANSWERING DEVICE UTILIZING MOBIUS LOOP ACTIVATING SWITCH

[75] Inventor: Neal Buglewicz, Rolling Hills, Calif.

[73] Assignee: Phone-Mate, Torrance, Calif.

[22] Filed: Feb. 11, 1974

[21] Appl. No.: 441,505

[52] U.S. Cl. .............................................. 179/6 R
[51] Int. Cl.² ..................... H04M 1/64; G11B 15/06
[58] Field of Search ................. 179/6 R, 100.1 DR; 360/137, 74, 90; 242/55.19 A

[56] References Cited
UNITED STATES PATENTS

| | | | |
|---|---|---|---|
| 2,496,047 | 1/1950 | Goddard | 360/134 |
| 3,281,039 | 10/1966 | Foley | 360/134 |
| 3,310,629 | 3/1967 | Yamamoto et al. | 179/6 R |
| 3,445,600 | 5/1969 | Todd | 179/6 R |
| 3,663,766 | 5/1972 | Goto | 360/74 |
| 3,713,039 | 1/1973 | Hashimoto | 179/6 R |

Primary Examiner—Vincent P. Canney
Attorney, Agent, or Firm—Gardner and Anten

[57] ABSTRACT

A telephone answering device employing a conventional tape recorder and an endlesss broadcast recording tape having a twist of 180° therein, popularly known as a Mobius loop, driven by the drive capstan of the conventional tape recorder, activates a tone switch and a shut-off switch in alternate 360° revolutions of the broadcast tape.

9 Claims, 4 Drawing Figures

TELEPHONE ANSWERING DEVICE UTILIZING MOBIUS LOOP ACTIVATING SWITCH

BACKGROUND OF THE INVENTION

The present invention relates to telephone answering and recording devices having the capability of playing back to a telephone caller a pre-recorded message and then recording any message from the caller.

In many of the conventional recording and answering devices, an endless loop of recording tape is used for pre-recording the broadcast message to be played to the caller. This is usually referred to as the broadcast tape. A second tape system, ordinarily having a reel-to-reel magnetic tape, is employed to record the messages from the callers.

The use of the endless tape for the playing of the pre-recorded message eliminates the need to periodically repeat the desired message along the entire length of the tape as well as the need for timing and switching systems for synchronizing the playing of the pre-recorded message and the recording the incoming message so they don't over lap one another. An example of an earlier one tape reel to reel system is U.S. Pat. No. 2,783,303.

In the conventional telephone answering devices, the endless recording tape has been known to include a strip of metallic foil of other means for switching the telephone answering device from one mode of operation to another, such as from the play-back to the record mode, as the endless tape completes a full revolution of 360°. Various types of switching means associated with an endless belt are disclosed in U.S. Pat. No. 3,458,667.

Recording devices have also used an endless recording tape having one 180° twist in the tape to increase the effective recording length of the endless tape. In particular, the device disclosed in the Patent to Burquez employes such an endless recording tape having a switching means, such as an off-centered hole in the tape or a strip of metallic foil on one side of the tape for switching receiving heads associated with each half-width of the twisted endless tape. This permits sequentially recording data on each half of the entire length of the endless belt, thereby increasing the effective length of the tape by a factor of two. The switching means on the twisted endless tape serves to alternately switch the receiving heads on each complete cycle of the endless recording tape.

Most of the previous telephone answering devices also employed some method for advising the caller that the telephone answering device was leaving the play back mode and was about to be switched into the record mode for recording the incoming message. In the standard telephone answering device this means consists of the use of a high frequency "beep," ordinarily obtained by feeding the output of an amplifier into the input, saturating the amplifier and resulting in a high frequency oscillatory signal.

One of the major goals in the designing of the telephone answering device has been the utilization of a system which is both efficient and at the same time as inexpensive as possible. Since there are essentially two complete systems in a telephone answering device the expense in manufacturing such telephone answering devices has resulted in a relatively high sales price for the product. Only by the use of multiple functions for many of the components and the capability of using inexpensive, yet reliable, components can the ultimate price of the telephone answering device be lowered so as to make the purchase price within the range available to the average consumer.

Also, in addition to being inexpensive and reliable, a certain minimal degree of quality must be achieved. A high noise level, normally the result of inexpensive components and simple mechanisms, will ordinarily be found unacceptable to a consumer of a product such as a telephone answering device.

Recording tape has two sides, one side being "rough." The rough side of a recording tape is that side of the tape which has been coated, ordinarily with a magnetic oxide, for recording. The non-coated side of the tape is smoother than the coated side.

In the present invention, the noise level normally produced when the rough side of the recording tape of the endless belt is drawn past a record-erase head of a tape recording system is minimized. This is achieved by the use of the endless belt in which there is one twist of 180 degrees, popularly known as the Mobius loop, so that while the tape recorder is in the recording mode, the endless loops has been inverted so that only the smooth surface of the endless belt is in contact with the record-erase head of the pre-recorded message record and play back systems.

It is therefore an object of the present invention to provide a telephone answering device which is less expensive than the previously available telephone answering devices.

An additional object of this invention is to provide a telephone answering device which is less expensive than the previously available telephone answering devices.

An additional object of this invention is to provide a device which utilizes, for the main part, commercially available recording instruments thus, reducing the extent of the manufacturing process and the resultant expense.

Another object is to provide a switching system which is reliable and is capable of using inexpensive switches.

A further object of the invention is to provide a telephone answering device which is simple to operate, reliable, and also has a high quality of sound reproduction.

Numerous other objects, features and advantages of the present invention, will be apparent from consideration of the following specification, taken in conjunction with the accompanying drawings.

In the present invention, a standard cassette type tape recorder is adapted for use as a telephone answering device by the addition of an endless broadcast tape for pre-recording a message to be played back to the caller. The broadcast tape has a 180° twist in it, forming a Mobius loop. A means for switching the telephone answering device from play back to record mode is associated with the endless broadcast tape. On alternate revolutions of the endless broadcast tape, a tone switch is activated for indicating to the caller that the caller's message is about to be recorded. The endless broadcast tape and the reel to reel tape of the conventional cassette recorder are both driven by a common capstan, although by different pinch rollers.

Figure 1:
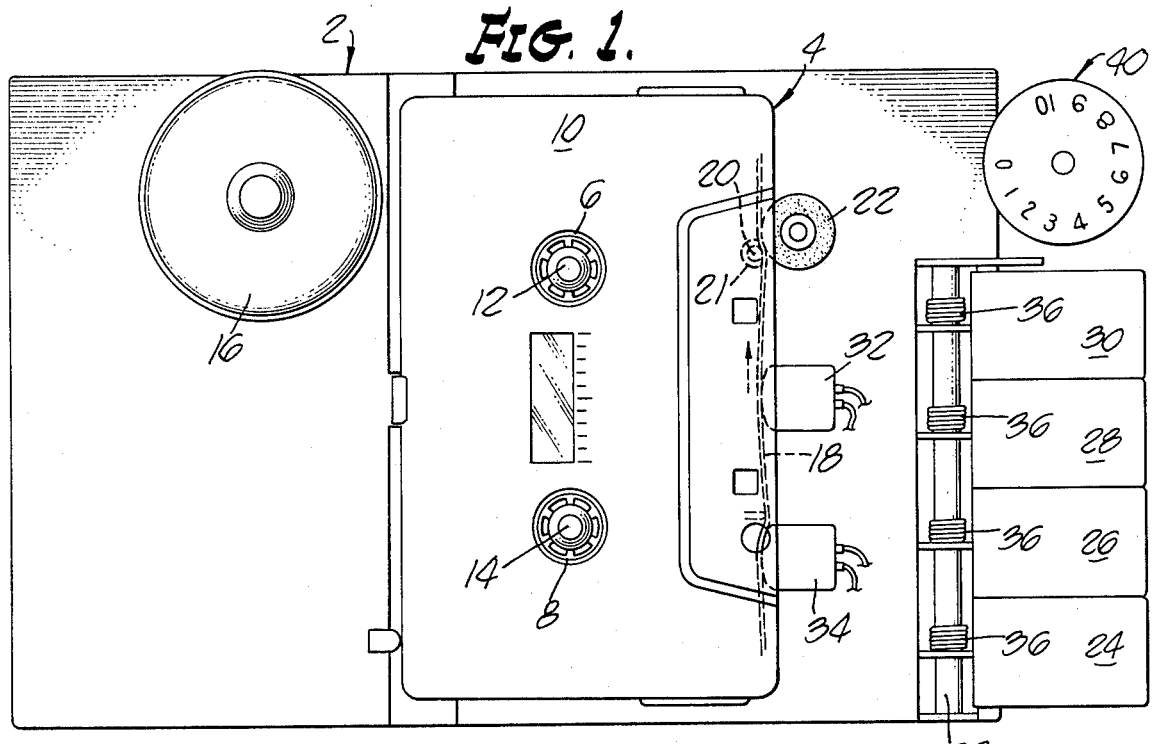
FIG. 1 is a top view of the telephone answering device with the control cover removed.

Referring to FIG. 1 of the drawings, a conventional tape recorder of the cassette type 2 is shown. As in the conventional recorder the cassette 4 has a take up reel 6 and a feed reel 8 stored in a tape housing 10 for mounting the recording tape 18. The center of the take up reel 6 and the feed reel 8 are mounted on projection pins 12 and 14 which are driven by a motor 16. The advancement of the recording tape 18 is controlled by the pressure of drive capstan 20, mounted on a central shaft 21, and the idler 22.

Control levers 24, 26, 28 and 30 control the direction of the movement of the recording tape 18 and selectively activate the play back head 32 or the record-erase head 34. The control levers 24-30 are biased by coil springs 36 which are mounted on a conventional shaft 38. A volume control 40 having incremental settings sets the level of the voltage input to the speaker (not shown), and to the telephone line.

Figure 2:
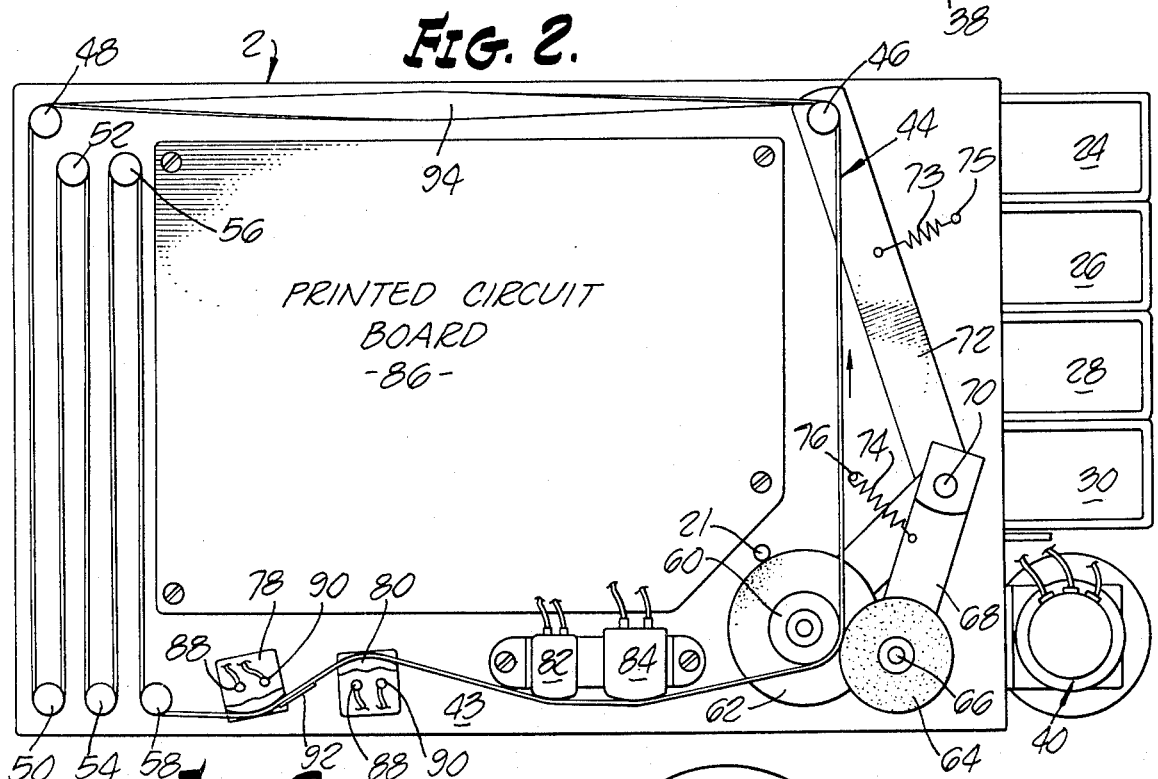
FIG. 2 is a bottom view of the telephone answering device with the control cover removed with the power to the telephone answering device about to be shut off.

Referring to FIG. 2 of the drawings the underside 43 of the telephone answering device containing the pre-recorded message record and play back controls are shown. An endless broadcast tape 44, parallel to the plane of space containing the cassette 10, is looped around a series of idler posts 46-58 and a drive capstan 60. The drive capstan 60 is driven in turn by the extension of control shaft 21 which is conventionally found in a tape recording device. A speed reduction gear 62 is used to reduce the speed of the drive capstan 60 to the desired speed. An idler 64 rotatably mounted on a rotatably shaft 66 mounted on lever member 68, which in turn is pivotably mounted about pin 70. The lever member 68 is spring biased against the endless broadcast tape 44 by extended spring 74 fixed at pin 76.

Lever arm 72 is pivotably fixed at one end to pin 70. At the other end of lever arm 72 is fixed idler post 46. Lever arm 72 is spring biased in a clock wise direction by spring 73 pinned at post 75, to tension the endless broadcast tape 44 the length of the endless broadcast tape 44 may vary within broad limits depending on the length of the message to be recorded and the speed of the tape. In the preferred embodiment the tape is 30 inches long and travels at a speed of 1 inch per second, permitting 30 seconds of message play back or recording.

Figure 3:
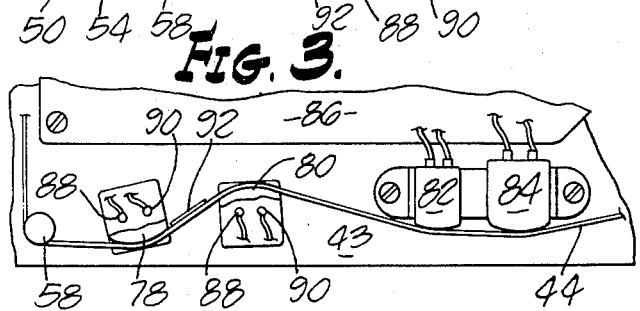
FIG. 3 is an isolated close-up view of the switching devices immediately following the activation of the tone signal.

A tone switch 78 and a shut off switch 80, shown in greater detail in FIG. 3 are fixed facing one another on opposite sides of endless broadcast tape 44. A recorde-rase head 82 and a play back head 84 record and play back a pre-recorded message on the endless tape 44. Printed circuit board 86, containing conventional circuitry, serves in conjunction with the control levers 24-30 to initially activate the play back head and the record-erase heads to record the desired message or the endless broadcast tape and to play it back.

The tone switch 78 and the shut off switch 80 have two contacts 88 and 90 which are in the normally opened position. The endless broadcast tape 44 has on one surface a strip of metallic foil 92 of a length greater than the width between the contacts 88 and 90 of the tone switch 78 and the shut off switch 80.

The printed circuit board 86 has circuitry for generating a high frequency oscillatory tone when the contacts 88 and 90 of the tone switch are closed. In the conventional oscillatory "beep" system the output of an amplifier is fed into the input of the amplifier, resulting in a high frequency oscillatory tone.

Figure 4:
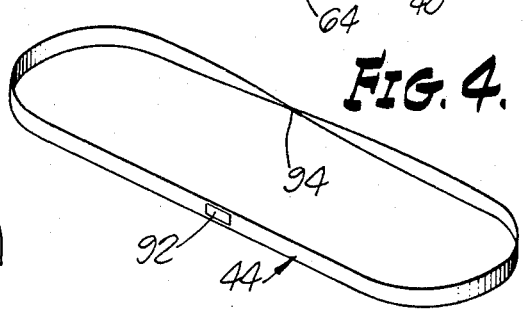
FIG. 4 is a prospective view of the endless broadcast tape having its ends spliced together 180 degrees out of phase.

The endless broadcast belt 44, shown in perspective view in FIG. 4, consists of conventional recording tape in a closed loop configuration. Prior to the ends of the broadcast tape being connected however, one end of the broadcast tape is twisted 180° out of phase. This results in a twist 94 being present in the tape. This type of loop is popularly known as a "Mobius" loop or strip.

One of the interesting and useful features of a Mobius loop, is that the surface of a Mobius loop is continual. A pencil placed on one surface of the Mobius loop and moved along the surface of the loop, without removing the pencil from the surface, will result in a pencil line being drawn around the entire "inside" and "outside" surface of the loop. Due to the twist 94 in the endless broadcast tape 44 the metallic strip 92 shown in FIG. 2 on the outside of the endless broadcast tape 44, after a complete revolution of 360 degrees will be twisted so as to be on the inside of the endless broadcast tape 44 as shown in FIG. 3.

OPERATION OF DEVICE

In operation, the telephone answering device described in detail above operates as follows:

The openings in the reels of cassette 4 are placed on the spindles 12 and 14 and record control lever 30 is depressed. Depression of control lever 30 activates motor 16 and drive shaft 21 as well as switching record-erase heads 34 and 82. Capstans 20 and 60 mounted on drive shaft 21 along with idlers 22 and 64 advance recording tape 18 and endless broadcast tape 44. During this stage of operation the message is recorded. The idler 64 is maintained in pressure contact with the broadcast tape 44 due to the biasing of lever arm member 68 by spring 74.

The strip of metallic foil on the endless broadcast tape 44 is facing outwardly in its initial starting position, as shown in FIG. 2. The endless broadcast tape 44 is looped around idler posts 46-58 in order to increase the length of braodcast tape in the most simple manner. Lever arm 72, tensioned by spring 73 keeps the pressure on the endless broadcast tape 44 constant.

The initial pre-recorded message may be placed upon the endless broadcast tape 44 until the strip of metallic foil on the endless broadcast tape 44 has made a complete revolution of 360° and the metallic foil, now inverted in position due to the twist 94 so as to be facing inwardly, short circuits contacts 88 and 90 of tone switch 78. The closing of the contacts 88 and 90 results in the circuitry of the printed circuit board 86 to emit a high frequency oscillatory tone, known as the "beep" tone. The beep signals the end of the play back of the message on the endless broadcast tape and advises the caller to be prepared to leave his message.

After emitting the beep signal the endless broadcast tape 44 continues to rotate around the idler posts 46-58 so that the strip of metallic foil 92 upon the endless broadcast tape once again is facing outwardly as it completes a full revolution 360°. As the tape completes this second revolution, the metallic foil 92 closes contacts 88 and 90 of shut off switch 80, closing the circuit on the printed circuit board, resulting in the power to motor 16 being interrupted, and shutting off the tape recorder. In the preferred embodiment the device is battery operated.

The printed circuit board 86 is electrically connected to the incoming telephone line of the telephone. Upon receipt of an incoming call a signal detector circuit contained in the printed circuit board, activates the unit. Both the endless broadcast tape 44 and the recording tape 18 start moving. As the endless broadcast tape 44 passes the play back head 84 the pre-recorded message is played through the telephone lines to the caller.

As the strip of metallic foil 92 on the endless broadcast tape 44 completes one revolution of 360° the metallic foil which had been directed outwardly has been inverted after passing twist 94 and is now directed inwardly closes contacts 88 and 90 of the tone switch 78. The closing of the contacts 88 and 90 of tone switch 78 results in the emmission of a high frequency oscillatory sound from the speaker of the tape recording device, signalling the caller to leave a message. The endless broadcast tape continues to move past the idler posts 46-58 with the smooth or shiny side of the tape 44 in contact with the record-erase head 84.

As the tone switch contacts 88 and 90 are closed the conventional circuit contained on the printed circuit board switches the mode of operation from play back to record by activating the record-erase head 34 of the main recording unit and deactivating play back heads 84 and 32 so as to thereafter record any incoming message upon the recording tape 18 contained in the cassette 4.

As the caller's message is recorded the endless broadcast tape 44 continues to move pass the idler posts 46-58 until the strip of metallic foil 92 upon the broadcast tape 44 again approaches the shut off switch 80. During this second revolution of the endless broadcast tape 44 the strip of metallic foil 92 has been again inverted so that the metallic foil is not outwardly directed and does not close the contacts 88 and 90 of the tone switch 78. In the first revolution of the endless broadcast tape 44 the strip of metallic foil had been directed outwardly so that after closing contacts 88 and 90 on the tone switch 88 the metallic foil would not close the contacts 88 and 90 of the shut off switch 90. The closing of contacts 88 and 90 of the shut off switch 80 disconnects power to the motor 16 and shuts off the unit. The unit is now in preparation for the receipt of another incoming call.

To play back the messages which have been received by the unit the control lever 26 is activated to rewind the tape contained on take up reel 6 onto feed reel 8. Control lever 28 is then activated so as to activate play back head 32. As the recording tape passes play back head 32 the original pre-recorded message, which was recorded by the recording tape 18 in the cassette as the prior recorded message was being played back to the caller, will be heard and then the message recorded from the caller will be heard. In this way the pre-recorded message and then the message of the caller will be heard. A fast forward speed may be used to pass the portions of the recording tape 18 where the pre-recorded message has been re-recorded. Appropriate indicating lights and dials may be adopted to indicate those portions of the tape which have the original pre-recorded message and those portions of the tape which have the messages from the callers.

Upon the completion of listening to all of the messages from the callers, the cassette 4 is rewound so that all of the tape is again on feed reel 8. It is not necessary to erase the endless broadcast tape 44 prior to recording a new message as standard tape recorders have the capability of erasing the tape automatically as new matter is recorded.

It should be realized that variations of the preferred embodiment discussed in detail above can be produced. For example, without limitations, a number of different switching devices could be used without departing from the concept of the invention disclosed herein.

I claim:

1. A telephone answering device comprising:
   a. A first recording tape for recording an incoming message;
   b. a play back head and a record-erase head associated with said first recording tape;
   c. a second recording tape for recording and playing back a pre-recorded message, said second recording tape comprising a closed loop said closed loop having a twist therein so as to form a Mobius loop, said pre-recorded message recorded on one surface of said loop;
   d. a play back head and a record-erase head associated with said second recording tape;
   e. a tone generating switch, said tone generating switch activated by a switching means associated with said second recording tape on one revolution of said second recording tape; and
   f. a power shut off switch, said power shut off switch activated by said switching means associated with said second recording tape on a second revolution of said second recording tape.

2. The telephone answering device of claim 1 in which said second recording tape has one surface smoother than its other surface, said smooth surface being drawn past the record-erase head associated with said second recording tape after said switching means associated with said second recording tape has activated said tone generating switch.

3. The telephone answering device of claim 2 in which said tone generating switch and said power shut off switch are located on opposite surfaces of said second recording tape.

4. The telephone answering device of claim 2 in which said first recording tape and said second recording tape are positioned in separate planes parallel to one another.

5. The telephone answering device of claim 4 in which said first recording tape and said second recording tape are driven by the same central drive capstan.

6. A telephone answering device activated by an incoming telephone call for playing back a pre-recorded message and recording a message from a caller comprising
   a. a first tape recording system comprising a play back head, a record-erase head and a recording tape.
   b. a second tape recording system comprising a play back head, a record-erase head, a second recording tape in the shape of an endless loop having a twist therein so as to form a Mobius loop, a switching means associated with said second recording tape, a tone generating switch activated by said switching means associated with said second recording tape on alternate revolutions of said second recording tape, a power shut off switch, said power shut off switch activated by said switching means associated with said second recording tape on alternate revolutions of said second recording tape.

7. The telephone answering device of claim 6 in which said recording tape has one surface which is smoother than its other surface, and said smooth surface is drawn across by said record-erase head associated with said second recording tape after said switching means associated with said second recording tape has activated said tone generating switch.

8. The telephone answering device of claim 7 in which said first recording tape and said second recording tape are both advanced by a common drive capstan at the same time.

9. The telephone answering device of claim 6 in which said recording tape of said first tape recording system is located on one side of the tape recorder base plate and said second recording tape of said second tape recording system is located on the other side of the tape recorder base plate.

* * * * *